United States Patent
Sakata et al.

(10) Patent No.: US 7,004,477 B2
(45) Date of Patent: Feb. 28, 2006

(54) REDUCED LOAD GASKET

(75) Inventors: David Sakata, Livonia, MI (US); Francis Joseph Walker, Tecumseh, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 38 days.

(21) Appl. No.: 10/442,915

(22) Filed: May 21, 2003

(65) Prior Publication Data

US 2004/0232626 A1 Nov. 25, 2004

(51) Int. Cl.
*F16L 17/00* (2006.01)
*F16J 15/02* (2006.01)

(52) U.S. Cl. .................... 277/612; 277/618; 277/626; 277/637; 277/639; 277/644; 277/654

(58) Field of Classification Search ............ 277/612, 277/618, 626–627, 637, 639, 644, 648, 650–651, 277/654, 554
See application file for complete search history.

(56) References Cited

U.S. PATENT DOCUMENTS

| | | | | |
|---|---|---|---|---|
| 2,857,179 A | * | 10/1958 | Riesing | 277/376 |
| 3,291,496 A | * | 12/1966 | Wiltse | 277/618 |
| 3,603,602 A | * | 9/1971 | Padula | 277/554 |
| 3,813,105 A | * | 5/1974 | McQueen | 277/554 |
| 4,165,881 A | * | 8/1979 | Salter | 277/425 |
| 4,426,086 A | * | 1/1984 | Fournie et al. | 277/309 |
| 4,468,043 A | * | 8/1984 | Brazel | 277/651 |
| 4,529,257 A | * | 7/1985 | Goodman et al. | 439/271 |
| 4,655,462 A |   | 4/1987 | Balsells |  |
| 4,826,144 A |   | 5/1989 | Balsells |  |
| 4,830,344 A |   | 5/1989 | Balsells |  |
| 4,876,781 A |   | 10/1989 | Balsells |  |
| 4,915,366 A |   | 4/1990 | Balsells |  |
| 5,597,168 A | * | 1/1997 | Antonini | 277/551 |
| 5,730,444 A | * | 3/1998 | Notter | 277/554 |
| 5,791,657 A | * | 8/1998 | Cain et al. | 277/554 |
| 5,799,953 A | * | 9/1998 | Henderson | 277/554 |
| 5,984,316 A |   | 11/1999 | Balsells |  |
| 5,992,856 A | * | 11/1999 | Balsells et al. | 277/553 |
| 6,050,572 A |   | 4/2000 | Balsells et al. |  |
| 6,264,205 B1 |   | 7/2001 | Balsells |  |

OTHER PUBLICATIONS

BalContact Advantages, "Canted Coil BAL Spring Technology, More Power in Less Space, Low, Medium and High Current Applications", vol. DM–7, pp. 1–24.

* cited by examiner

*Primary Examiner*—Vishal Patel
(74) *Attorney, Agent, or Firm*—Ronald W. Wangerow; Harness, Dickey & Pierce, P.L.C.

(57) ABSTRACT

A gasket is adapted to seal between a first member and a second member, and includes a first portion a second portion. The first portion includes a first elastomeric seal portion adapted to be in sealing engagement with the first member. The first portion may also include a clip or a coil spring contained within an elastomeric portion in order to provide a sealing force against the first member. The second portion is preferably molded integral with the first portion and includes a second elastomeric seal portion having a coil spring contained therein. The second portion is adapted to be in sealing engagement with the second member, with the coil spring being compressed in its normal direction when the gasket is assembled between the first member and the second member. The coil spring, then, exerts a sealing force with minimal degradation over time.

18 Claims, 5 Drawing Sheets

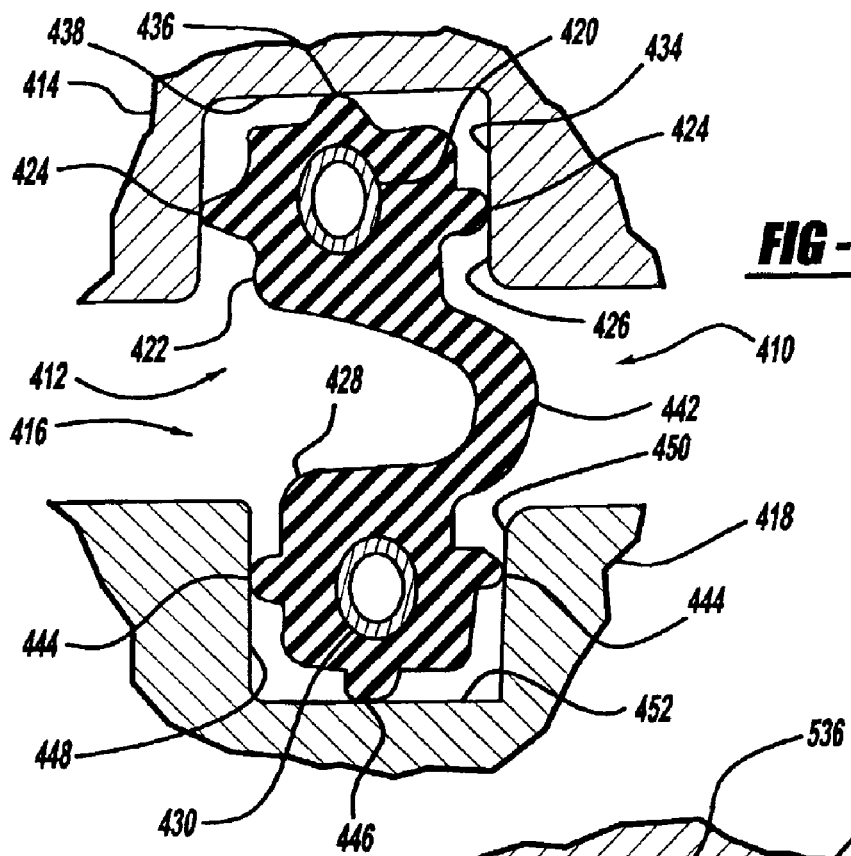
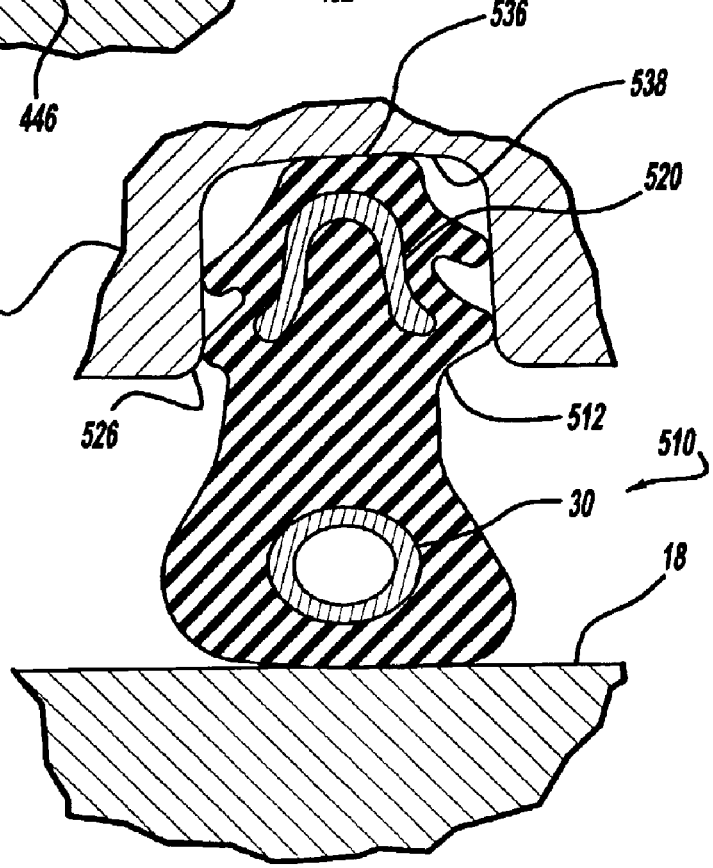

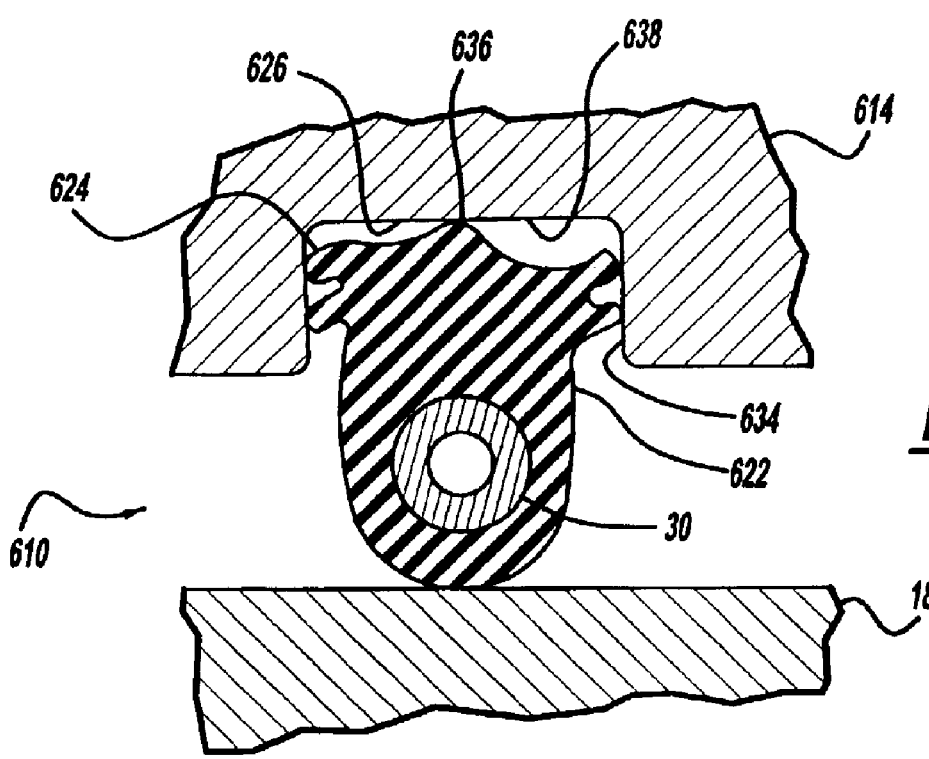

US 7,004,477 B2

REDUCED LOAD GASKET

BACKGROUND OF THE INVENTION

This invention relates in general to fluid seals. More specifically, this invention relates to gaskets that connect two sealing portions, which prevent fluid leakage between the two, while reducing the contact pressure between the two members.

In general, conventional gaskets require a relatively high compressive load between the members being sealed in order for the gasket to provide an effective seal over time. For example, a conventional gasket placed between two stationary members, such as an engine block and an oil pan, or a cylinder head and a valve/cam cover, is compressed between these elements under a relatively high contact pressure in order to produce an effective seal. A significant reason that a very high contact pressure is required is because these conventional gaskets lose their sealing force over time. A conventional rubber gasket, for example, may lose as much as ninety-percent of its initial loading over time, so the initial sealing force needs to start out very high to account for this degradation.

Moreover, in the applications that require the high compressive sealing load, the number and placement of fasteners must compensate for deflections caused by the high loading conditions in order to assure a good seal all of the way around the gasket. Often, then, the number of fasteners will be increased just to account for the high initial compressive sealing load.

Additionally, these highly compressed gaskets can become a medium for transmitting vibrations, thus creating poor noise, vibration and harshness (NVH) isolation characteristics between the two members. That is, the vibration load input from one member is easily transferred through the gasket to the other member.

Examples of such conventional gaskets requiring a high sealing load between the members include an elastomeric gasket, shaped as an O-ring or similar shape, as well as an edge bond gasket, a carrier gasket, and a rubber coated metal (RCM) gasket. All of these conventional gaskets require a high compressive sealing load to assure an effective seal between the members, so the effectiveness of vibrational isolation of one member from the other is poor and the number of fasteners needed for sealing may be higher than is necessary for securing the two members together. Another example of a conventional gasket is one formed from a room temperature vulcanite (RTV) located between the two members. The RTV is applied as a liquid in a thin layer and cures when exposed to air. For effective sealing with the RTV, however, it requires a hard mount between the members, which also provides poor vibration isolation.

In many applications, including automotive applications, it is desirable to reduce the transmission of vibrations. A reduction of the transmission of vibrations can result in a reduction in noise and harshness, so it is desirable to reduce the transmission of vibrations between two sealed elements, such as an engine block and an oil pan—or engine head and rocker/cam cover. Also, in order to minimize the cost of and time to assemble two members together, it is desirable to minimize the number of fasteners required for effective sealing.

Thus, it is desirable to have a gasket that will properly seal between two members while minimizing the compressive sealing force required.

SUMMARY OF THE INVENTION

In its embodiments, the present invention contemplates a gasket adapted for sealing between a first member and a second member. The gasket has a first portion including a first elastomeric seal portion adapted to be in sealing engagement with the first member. The gasket also has a second portion sealingly engaging the first portion and including a second elastomeric seal portion and a coil spring contained therein, with the second elastomeric seal portion adapted to be in sealing engagement with the second member and the coil spring having a normal direction and adapted to be compressed in the normal direction when the gasket is assembled between the first member and the second member.

An advantage of the present invention is that effective sealing is achieved between two members over time while minimizing the sealing force required to maintain this seal.

Another advantage of the present invention is that the number of fasteners needed to secure two members together while still maintaining an effective seal may be reduced.

A further advantage of the present invention is that the gasket assembly with the spring is relatively inexpensive and easy to manufacture.

BRIEF DESCRIPTION OF THE DRAWINGS

FIG. 7 is a partial, sectional view of a gasket mounted between two members in accordance with a fifth embodiment of the present invention.

FIG. 8 is a partial, sectional view of a gasket mounted between two members in accordance with a sixth embodiment of the present invention.

FIG. 9 is a partial sectional view, similar to FIG. 1, but showing a seventh embodiment of the present invention.

DETAILED DESCRIPTION

Figure 1:
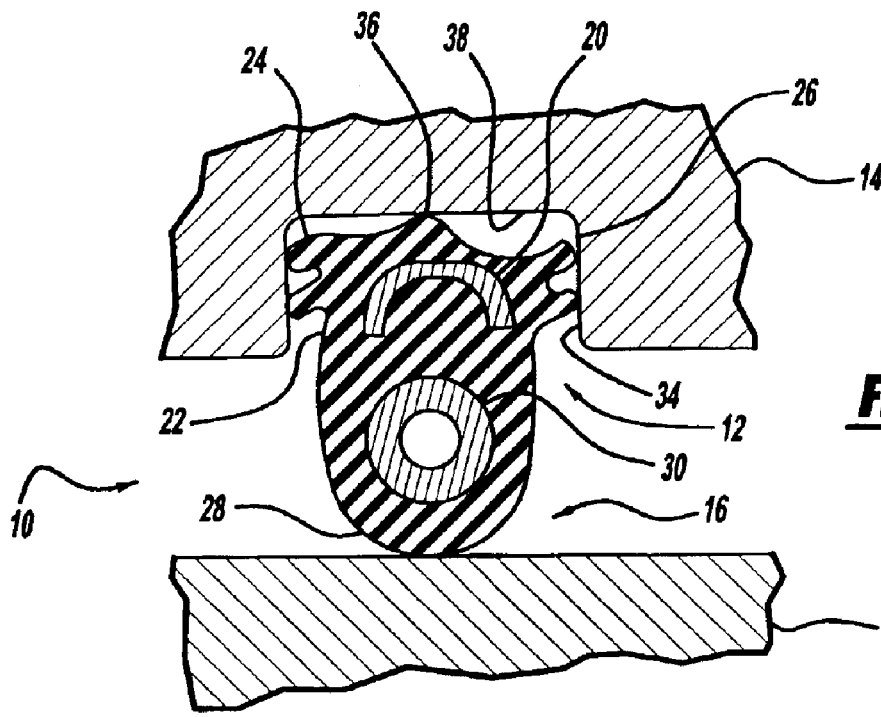
FIG. 1 is a partial, sectional view of a gasket mounted between two members, prior to fully compressing the gasket, in accordance with a first embodiment of the present invention.

FIG. 1 illustrates a gasket 10 for sealing between a first member 14 and a second member 18 according to a first embodiment of the present invention. The gasket 10 includes a first portion 12 that engages the first member 14 for sealing between the gasket 10 and the first member 14, and a second portion 16 that engages the second member 18 for sealing between the gasket 10 and the second member 18. The first member 14 and second member 18 may be, for example, an engine block and an oil pan, or a rocker/cam cover and a cylinder head—although, the gasket 10 of the present invention may be used to seal between other types of components where a fluid seal is desirable.

The first portion 12 includes clip 20, which is preferably made of a metal, such as steel, although it may also be formed of a suitable plastic or other relatively stiff material. The clip 20 is preferably formed into a C-shape and molded within a first elastomeric seal portion 22. The first elastomeric seal portion 22 may be made from an elastomer, thermoplastic elastomer, or other suitable flexible sealing material. Depending upon the particular fluid to be sealed, it can be formed of a material that forms a suitable permeation barrier for that particular fluid, or may be coated with a different material that forms a permeation barrier which will reduce emissions leakage of the fluid. In either case, such materials are known to those skilled in the art.

The first elastomeric seal portion 22 preferably includes sealing beads 24 that project therefrom to engage with a recess 26 in the first member 14 to seal between the two. The sealing beads 24 will generally increase the effectiveness of sealing against the first member 14 by causing the sealing force to peak at those locations. The sealing beads 24 extend out wider than the width of the recess 26 such that, when the first portion 12 of the gasket 10 is inserted into the recess 26, the sealing beads 24 and the first portion 12 will be compressed, causing the clip 20 to bend. The compression of the sealing beads 24 and the bending of the clip 20 will create a sealing force against the sides 34 of the recess 26. In this way, sealing against the first portion 12 is accomplished within the recess 26, without the need for a compressive loading created by compressing the second member 18 against the gasket 10. In addition, the retention of the first portion 12 in the recess 26 will positively locate the gasket 10 relative to the first member 14. The shape and amount of compression of the sealing beads 24 shown herein are for illustrative purposes only—the actual shape and amount of compression for the sealing beads will depend upon the particular application and is known to those skilled in the art.

The second portion 16 includes a second elastomeric sealing portion 28, which surrounds a spring 30. Preferably, the second elastomeric sealing portion 28 is molded integrally with the first sealing portion 22 and the sealing beads 24, and molded around the spring 30. A preferred molding method is extrusion molding, although other methods known to those skilled in the art may also be advantageously employed. The spring 30 is preferably made of a metal, such as steel, but may also be formed from a suitable plastic material. After molding, the ends (not shown) of the spring 30 are preferably hooked together or employ some other conventional method of mechanically attaching them, and the ends (not shown) of the elastomeric portions are preferably connected by employing a conventional liquid elastomer, in order to form a complete loop for the gasket 10.

The spring 30 is preferably a slanted coil spring, rather than a ninety-degree coil spring. The slanted coil spring 30 more readily allows for compressibility in a direction normal to its length (i.e. in the vertical direction as viewed in FIG. 1). The compression of the spring 30 in the normal direction will then create a vertical sealing force (as viewed in FIG. 1), causing the second elastomeric portion 28 to press against the second member 18. Also, preferably, the first portion 12 includes a sealing bead 36 that will be pressed against the top 38 of the recess 26 due to this vertical sealing force.

Figure 5:
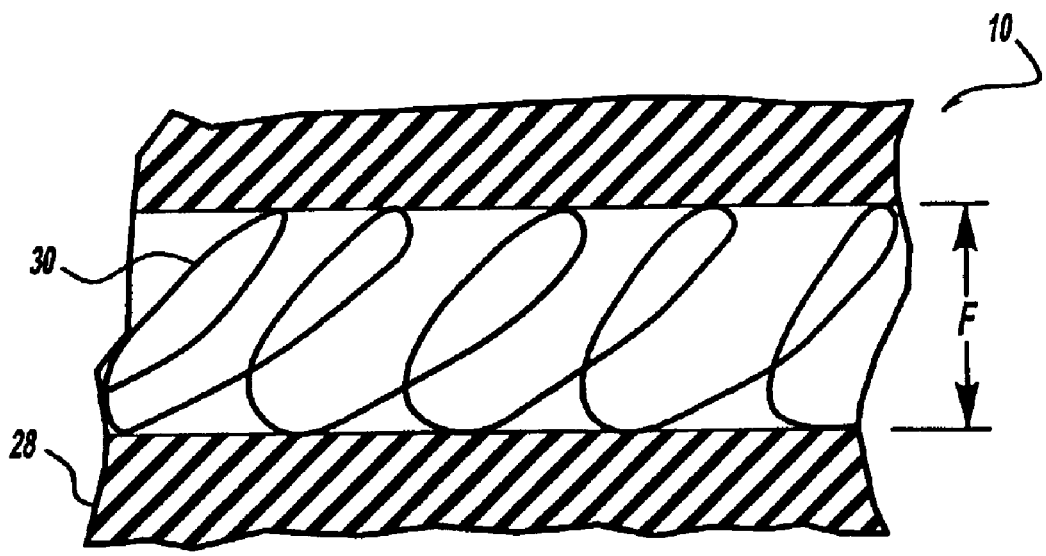
FIG. 5 is a schematic of a spring located within a gasket.

FIG. 5 illustrates a schematic of the spring 30 located in the gasket 10 when the gasket 10 is compressed in the direction normal to its length, (i.e. the normal direction is the vertical direction as Viewed in FIG. 5). As the second elastomeric sealing portion 28 is compressed, the spring 30 is also compressed. In this compressed state, the spring 30 produces a vertical force F pressing back against the second sealing portion 28. Since the spring is preferably made of steel, and the sealing force F is generated by bending the spring out of its static position, this sealing force F does not degrade over time like that produced by an elastomeric material such as rubber. A rubber seal may, for example, lose up to ninety percent of its sealing load over time due to degradation, while the steel spring 30 may only lose, for example, about one to two percent of its sealing load over the same time. Thus, the gasket 10 will create an adequate seal over time by applying a more constant, light load, while requiring significantly lower initial sealing load.

Again referring to FIG. 1, during assembly of the first member 14 to the second member 18, the distance between the members 14, 18 is generally established at the fastener locations (not shown). Each fastener assembly (not shown) acts to set the spacing of the first member 14 from the second member 18, thus limiting the compression in the gasket 10. The exact size and shape of the gasket 10 will vary depending upon the particular members to be sealed, but will be such that the gasket 10 is only compressed sufficiently to create a good long term seal, but not essentially fully compressed, as is the case with conventional gaskets. The particular details of such fastener assemblies, employing, for example, spacers or grommets, are generally known to those skilled in the art. Moreover, the fasteners are preferably located outside of a high pressure area to be sealed. By locating the fasteners outside of an area to be sealed, the fastener assemblies need not include their own seals around the fastener holes.

The number of fastener locations and spacing also depends upon the particular members being joined, the pressure difference of the fluids, as well as other typical factors considered for sealing between two members. However, by employing gaskets according to this invention, it is likely that the number of fasteners needed to join two members can be reduced since the balancing of a relatively high gasket load is eliminated.

In the prior art, the sealing load was established by the two members being compressed together under a high compressive load, with a gasket between them. This resulted in any elastomeric portion of the gasket being essentially fully compressed, so it cannot provide any type of vibrational isolation between the members. On the other hand, as discussed above, in the embodiments of the present invention, the gasket 10 is under a significantly smaller sealing load. Since the gasket 10 is not highly compressed due to a compression sealing load between the members 14, 18, there is minimal transfer of vibration between the members 14, 18 via the gasket 10, (vibrationally decoupling the first and second members).

Figure 2:
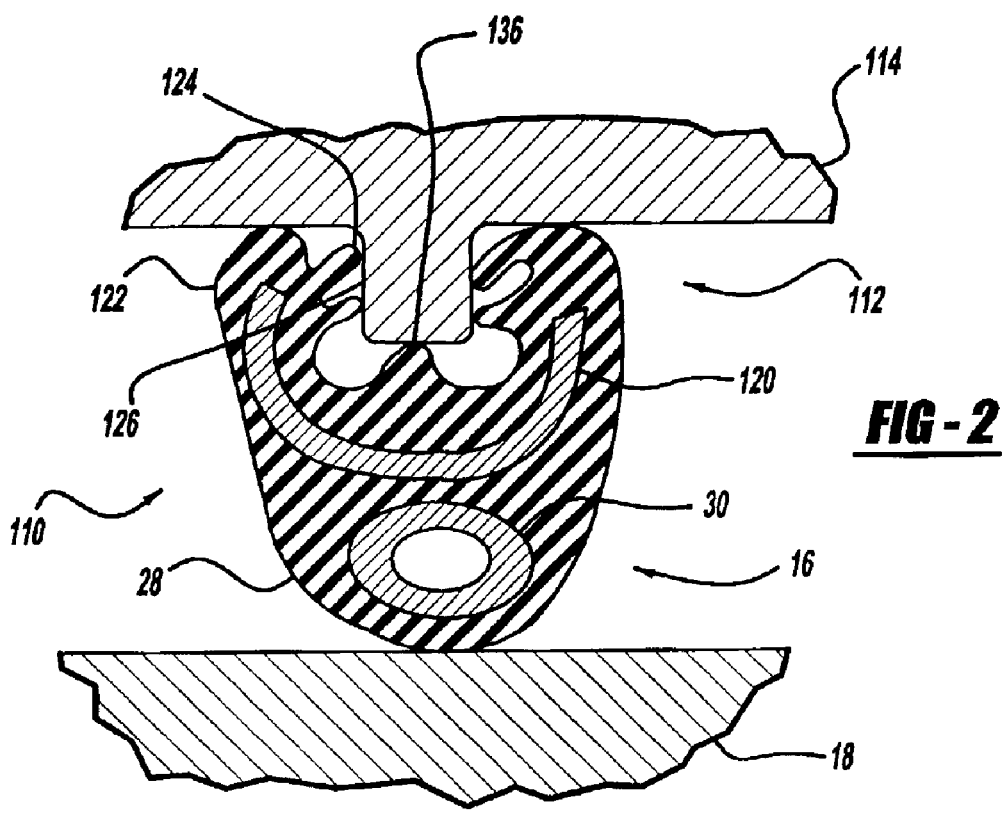
FIG. 2 is a partial sectional view, similar to FIG. 1, but showing a second embodiment of the present invention.

FIG. 2 illustrates a second embodiment of a gasket, indicated generally at 110, according to this invention. Elements in this embodiment that are similar to elements in the first embodiment will be similarly designated, but with a 100-series number, while elements that are the same will be designated with the same number. A first portion 112 includes a clip 120, preferably molded into a first elastomeric seal portion 122, but the two are now shaped to surround a flange 126 extending from the first member 114 rather than fit into a recess. Sealing beads 124 project from the first seal portion 122 toward the flange 126 and provide a narrower opening in their uncompressed state than the width of the flange 126. Once assembled together, then, the clip 120 and first seal portion 122 will provide a compressive sealing load against the flange 126. Again, the gasket 100 will also be positively located and secured relative to the first member 114. The gasket 110 again includes a second portion 16 having an elastomeric sealing portion 28 with a spring 30 molded therein. During assembly of the first member 114 to the second member 18, the spring 30 will be compressed, creating a sealing force which presses the second elastomeric sealing portion 28 against the second member 18 and a sealing bead 136 against the flange 126.

Figure 3:
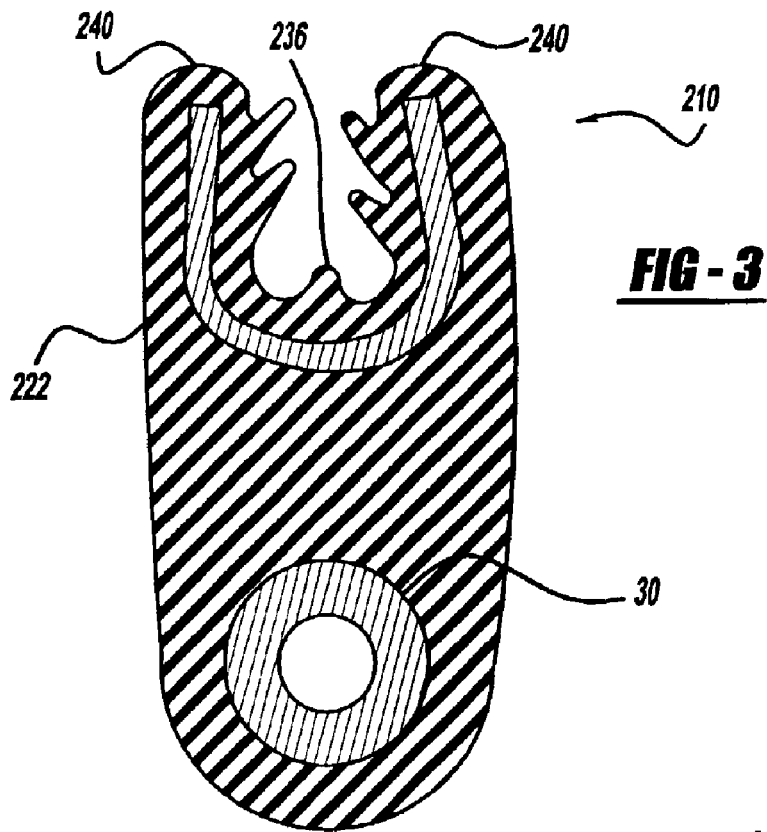
FIG. 3 is a partial, sectional view of a gasket showing a third embodiment of the present invention.
Figure 4:
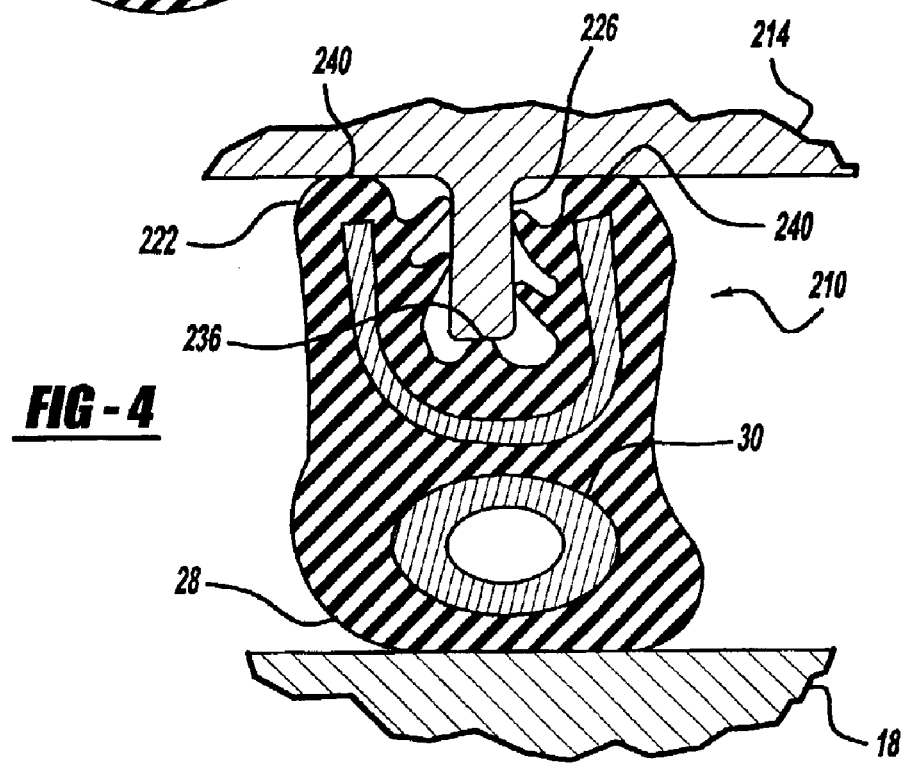
FIG. 4 is a partial, sectional view of the gasket of FIG. 3 shown mounted and compressed between two members.

FIGS. 3 and 4 illustrate a third embodiment of a gasket 210 according to this invention. Elements in this embodiment that are similar to elements in the second embodiment will be similarly designated, but with a 200-series number, while elements that are the same will be designated with the same element number. FIG. 3 shows the gasket 210 in a free (i.e. uncompressed) state, while FIG. 4 shows the gasket 210 in a sealing (i.e. compressed) state. The gasket 210 of FIGS. 3 and 4 is very similar to the gasket of FIG. 2, but the gasket 210 is received between the two members 214, 18 such that it is compressed more than in the second embodiment. The compressive load again causes the spring 30 to compress, thus producing a sealing load that presses the second sealing portion 28 against the second member 18 and the sealing bead 236 against the flange 226. Additionally, the sealing load from the spring 30 causes the ends 240 of the first elastomeric seal portion 222 to seal against the first member 214.

Figure 6:
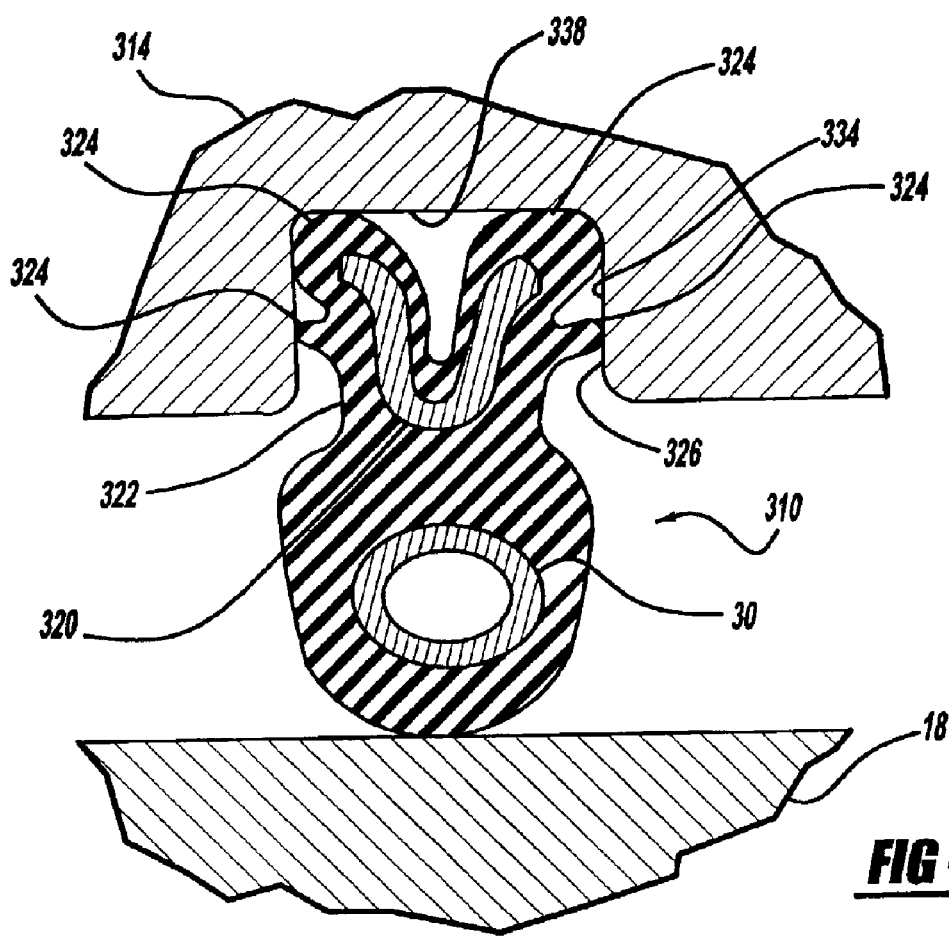
FIG. 6 is a partial, sectional view of a gasket mounted between two members in accordance with a fourth embodiment of the present invention.

FIG. 6 illustrates a fourth embodiment of the present invention. Elements in this embodiment that are similar to elements in the previous embodiments will be similarly designated, but with a 300-series number, while elements that are the same will be designated with the same element number. The gasket 310 again includes a first elastomeric seal portion 322 that mounts within a recess 326 in the first member 314, similar to the first embodiment, but the molded-in clip 320 is oriented with its open end facing up (as seen in FIG. 6). In addition, the first seal portion 322 is molded to generally follow the contour of the open end of the clip 320, which eliminates a fifth sealing bead. Instead, two of the sealing beads 324 compress against both the sides 334 and the top 338 of the recess 326. The sealing force causing the four sealing beads 324 to compress against the sides 334 of the recess 326 is created by the clip 320 and first sealing portion 322, while the sealing force causing two of the sealing beads 324 to compress against the top 338 of the recess 326 is generally created by the spring 30 as it acts against the second member 18.

FIG. 7 illustrates a fifth preferred embodiment of a gasket 410 according to this invention. Elements in this embodiment that are similar to elements in the previous embodiments will be similarly designated, but with 400-series numbers, while elements that are the same will have the same element number. A gasket 410 is shown that includes a first portion 412, a second portion 416, and an elastic arm 442 extending between the first portion 412 and the second portion 416.

The first portion 412 includes a first elastomeric seal portion 422, with a slanted coil spring 420 preferably molded therein. A pair of sealing beads 424 extend outward from the first seal portion 422 into sealing engagement with sides 434 of a recess 426 in a first member 414. The width of the first portion 412 is greater than the width of the recess 426 so that, upon insertion of the first portion 412, the sealing beads 424 and spring 420 will be compressed. The spring 420 will be compressed in a direction normal to its length (i.e. in the horizontal direction as seen in FIG. 7). The compressed spring 420 and beads 424, then, will exert a sealing force against the sides 434 of the recess 426. Also, the first portion 412 is positively located and secured relative to the first member 414 by this configuration. Optionally, a sealing bead 436 may also extend from the first seal portion 422 and into contact with the top 438 of the recess 426, although, as discussed below, the sealing force acting on this bead 436 will be relatively small compared to the sealing force on the other beads 424.

The second portion 416 is configured essentially the same as the first portion 412, with a second elastomeric sealing portion 428 having a spring 430 molded therein and sealing beads 444, 446 extending therefrom. Again, the sealing beads 444 extend outward into sealing engagement with sides 448 of a recess 450 in a second member 418, and the sealing bead 446 extends outward into sealing engagement with the bottom 452 of the recess 450. The spring 430 and beads 444 generate a sealing force acting against the sides 448 of the recess 450.

The elastic arm 442 extends between and is preferably formed integrally with the first portion 412 and the second portion 416. It is preferably made of the same elastomeric material. The elastic arm 442 is sized and shaped so that, after assembly of the two members 414, 418, it is not in a fully compressed state nor in a fully expanded state, allowing it to relatively easily flex. Since the elastic arm 442 is relatively flexible and not subjected to relatively high compressive forces, the first and second portions 412, 416, and hence the first and second members 414, 418, are essentially vibrationally decoupled. And yet, a complete seal between the two members 414, 418 is achieved. The elastic arm 442 may be relatively smooth, acting like a membrane, as is illustrated in the FIG. 7, or, alternatively, may be formed as a bellows (not shown).

The sealing force created by each coil spring 420, 430, then, is directed toward the sides 434, 448, respectively, rather than acting in a direction that creates a compressive force acting between the two members 414, 418. Thus, appropriate sealing and retention is attained without requiring a compressive force between the members 414, 418. However, while this embodiment increases the amount of vibrational decoupling between the first member 414 and the second member 418, the elastic arm 442 does not allow for much, if any, compressive force between the members 414, 418, so the sealing force of the beads 436, 446 acting against the members 414, 418, respectively, will be relatively low.

FIG. 8 illustrates a sixth preferred embodiment of a gasket 510 according to this invention. Elements in this embodiment that are similar to elements in the previous embodiments will be similarly designated, but with 500-series numbers, and elements that are the same will be designated with the same element number. This embodiment is similar to the embodiment of FIG. 6, but with a different arrangement of the first portion 512. In this embodiment, the clip 520 is oriented with its open end facing down (as seen in FIG. 8), and a sealing bead 536 acting against a top 538 of a recess 526 in the first member 514 is relatively wide. The spring 30 is again compressed in order to create a sealing force between the first member 514 and the second member 18.

FIG. 9 illustrates a seventh preferred embodiment of the gasket 610 according to this invention. Elements in this embodiment that are similar to elements in the previous embodiments will be similarly designated, but with 600-series numbers, and elements that are the same will be designated with the same element number. This embodiment is similar to the embodiment of FIG. 1, but without a clip molded into the first elastomeric seal portion 622. The sealing beads 624 are still compressed against the sides 634 of the recess 626, but without the clip, that sealing force may degrade over time more than if a clip is maintaining the sealing force. The spring 30 is compressed during assembly of the first member 614 to the second member 18, and so a sealing force is still created by the spring 30 that will compress sealing bead 636 against the top 638 of the recess 626. And, as in the first embodiment, since this sealing force is generated by the spring 30, the degradation over time will be minimal.

While certain embodiments of the present invention have been described in detail, those familiar with the art to which this invention relates will recognize various alternative designs and embodiments for practicing the invention as defined by the following claims.

What is claimed is:

1. A gasket system, comprising:
   a first member,
   a second member non-rotatably mounted relative to the first member; and
   a gasket disposed axially between said first and said second member and including a first portion having a first elastomeric seal portion with at least one sealing bead extending therefrom in sealing engagement with the first member, and including a first retention member generally enclosed within the first elastomeric seal portion and adapted to secure and seal the first portion to the first member, and a second portion connected with the first portion and including a second elastomeric seal portion and a coil spring contained therein, with the second elastomeric seal portion in sealing engagement with the second member and the coil spring being compressed, in a normal direction of the coil spring, between the first member and the second member.

2. The gasket system according to claim 1 wherein the first retention member is a C-shaped clip.

3. The gasket according to claim 1 wherein the first retention member is a second coil spring.

4. The gasket according to claim 3 wherein the second coil spring is a slanted coil spring.

5. The gasket system according to claim 1 wherein the coil spring is a slanted coil spring.

6. The gasket system according to claim 5 wherein the slanted coil spring is made of one of a metal and a plastic material.

7. The gasket system according to claim 1 wherein the at least one sealing bead of the first elastomeric seal portion includes a plurality of sealing beads adapted to sealingly engage the first member.

8. The gasket system according to claim 7 wherein the first member includes a recess and the sealing beads are adapted to sealingly engage the first member within the recess.

9. The gasket according to claim 7 wherein the first member includes a flange protruding therefrom and the sealing beads are adapted to sealingly engage the flange.

10. The gasket according to claim 1 further including an elastomeric arm sealingly connecting the first portion to the second portion to thereby sealingly engage the first portion to the second portion, and with the elastomeric arm being in a less than fully compressed state and a less than fully expanded state.

11. The gasket according to claim 10 further including a second coil spring generally enclosed within the first elastomeric seal portion and having a second normal direction, and with the first member including a recess adapted to receive the first elastomeric seal portion therein while compressing the second coil spring in the second normal direction.

12. The gasket according to claim 11 wherein the second member includes a recess adapted to receive the second elastomeric seal portion therein while compressing the coil spring in the normal direction.

13. The gasket according to claim 12 wherein the coil spring and the second coil spring are each slanted coil springs.

14. The gasket according to claim 10 wherein the first elastomeric seal portion includes sealing beads adapted to sealingly engage the first member and the second elastomeric seal portion includes sealing beads adapted to sealingly engage the second member.

15. A gasket system, comprising:
    a first member;
    a second member non-rotatably mounted relative to the first member; and
    a gasket disposed axially between said first member and said second member and including a first portion having a first elastomeric seal portion adapted to be in sealing engagement with the first member, a C-shaped clip generally enclosed within the first elastomeric seal portion, and a second portion sealingly engaging the first portion and including a second elastomeric seal portion and a slanted coil spring contained therein, with the second elastomeric seal portion adapted to be in sealing engagement with the second member and the coil spring having a normal direction and adapted to be compressed in the normal direction when the gasket is assembled between the first member and the second member.

16. The gasket system according to claim 15 wherein the first member includes a recess and the C-shaped clip is adapted to create a sealing force causing the first elastomeric seal portion to be compressed against the recess.

17. The gasket according to claim 15 wherein the first member includes a flange extending therefrom and the C-shaped clip is adapted to create a sealing force causing the first elastomeric seal portion to be compressed against the flange.

18. The gasket system according to claim 16, wherein the first elastomeric seal portion includes a plurality at sealing beads engaging the recess in the first member.

* * * * *